United States Patent [19]

Hill et al.

[11] Patent Number: 5,035,540
[45] Date of Patent: Jul. 30, 1991

[54] SHALLOW WATER PIPELINE TRACKER SYSTEM

[75] Inventors: Robert M. Hill, Boling; Gordon Barksdale, Webster, both of Tex.

[73] Assignee: Eastport International, Houston, Tex.

[21] Appl. No.: 581,736

[22] Filed: Sep. 12, 1990

[51] Int. Cl.⁵ .............................................. F16L 1/12
[52] U.S. Cl. ..................................... 405/157; 405/158
[58] Field of Search ............... 405/154, 157, 158, 159, 405/173; 324/323, 326, 345; 367/99, 128, 130, 131

[56] References Cited

U.S. PATENT DOCUMENTS 3,796,058  3/1974  Jones et al. .................... 405/157
4,767,237  8/1988  Cosman et al. ................. 405/157

FOREIGN PATENT DOCUMENTS 2386826  12/1978  France ........................... 405/157
2007598   5/1979  United Kingdom ............. 405/157

Primary Examiner—David H. Corbin
Attorney, Agent, or Firm—Pravel, Gambrell, Hewitt, Kimball & Krieger

[57] ABSTRACT

A method and apparatus for conducting a survey to determine the location and elevation of a buried pipeline located in a shallow water environment. The method includes determining whether submerged obstacles are located between the ends of that portion of the line being measured and measuring the depth of the line by taking magnetic sounding of the buried line at spaced intervals by crossing the line at longitudinally spaced points with the magnetic survey apparatus. The apparatus includes a towed sled for carrying the magnetic sensing device.

6 Claims, 1 Drawing Sheet

SHALLOW WATER PIPELINE TRACKER SYSTEM

BACKGROUND OF THE INVENTION

There are several thousands of miles of submerged pipelines installed in the Gulf of Mexico and adjacent bays and in other submerged lands in which oil and gas production occurs. Many have a shore landing and many are in shallow coastal bays. While these lines are initially buried beneath the surface of the bottom, over time due to currents, storms and other forces the fill or overburden beneath which the lines are buried is disturbed so as to cause portions of the line to be exposed or part of the overburden to be shifted or removed. This has proven to be a dangerous condition because the exposed pipelines are subject to be hit and possibly ruptured by vessels navigating or fishing in shallow waters or being caught by anchors or nets drug along the bottom by fishing boats and particularly by shrimp trawls.

Since the pipelines carry hydrocarbons such as natural gas and/or oil at relatively high pressures, a break in the line can result in explosion or fire as well as the accidental discharge of oil and/or gas with adverse environmental consequences.

It is therefore desirable to periodically inspect the pipeline to determine whether any portion of the line is exposed or whether the overburden has been disturbed so that the pipeline is buried at a shallower depth then desired.

Apparatus is available for tracking submerged pipelines in relatively deep water, say at depths exceeding 10-12 feet. Such apparatus includes a Remote Operating Vehicle (R.O.V.) for carrying the magnetic sensors. This apparatus is tethered to a surface vessel and steered by remote control guidance means carried on the R.O.V. Such guidance means includes jet propulsion pumps and motors for raising and lowering the submarine as well as for turning it from side to side to steer it along the path of the pipeline at a desired distance off of the bottom. The sheer size of the submarine and its associated support equipment carried by the surface vessel renders operation in shallow water impractical, if not impossible. For example, the weight of the handling equipment for launching and retrieving the submarine from the surface vessel typically weights in excess of 20 tons and thus requires a large displacement vessel to carry such weight. The present invention however eliminates these disadvantages and provides means for tracking a pipeline buried in shallow water without the need for a large displacement vessel.

It is an object of the present invention to provide a submergible sled adapted to rest on the bottom for transporting an array of magnetic sensors for locating a submerged pipeline.

A further object of the present invention is a method of gathering data with electronic sensors by moving the sensor array laterally across the pipeline at longitudinally spaced points and gathering data with respect to the depth of the pipeline beneath the surface of the bottom at each pass and correlating the data from the longitudinally spaced points to determine the location of the pipeline with respect to the surface of the water bottom.

DESCRIPTION OF THE PREFERRED EMBODIMENT

In surveying a pipeline to develop a buried depth profile using the method and apparatus of the present invention, the following is done: The course of that portion of the pipeline P to be surveyed is marked with markers M, such as buoys or stakes, at each end. The distance between the end markers is surveyed using high resolution surface sonar to determine whether any submerged obstructions or exposed lengths of the pipeline exist. The desired frequency and pattern of sampling points along the pipeline is determined and the points are marked with buoys or other markers at the selected intervals to guide the crew in moving the sensor array according to the crossing pattern. The spacing of the crossings or data gathering points will be determined according to the size (diameter) of the pipeline as well as the bottom material and configuration.

With the crossing pattern markers set in place, the towed array sled S is launched and then moved back and forth across the pipeline P according to the crossing pattern and data is gathered with respect to the depth of the line at each crossing point. The sensors are preferably towed along a path or course that extends at approximately a right angle to the axis of the pipeline, however suitable results can be obtained when the crossing angle is within the range of from twenty degrees to one hundred sixty degrees relative to the axis of the pipeline. At each crossing point the burial depth of the line is recorded and correlated to a navigation system which reflects the latitude and longitude of each crossing point over the line. In the preferred embodiment, the magnetic sensors designated generally S are of the Innovatum Pipe Tracker type which is an apparatus furnished by Innovatum Inc. of Houston, Texas and consisting of 3 flux gate gradiometers and one two axis flux gate sensor. The sensors S are coupled to a data processing unit and a suitable computer in which the data points are stored and which are used for generating a printout showing the elevation and azimuth of the pipeline between the data points along the line between the marked ends.

Figure 1:
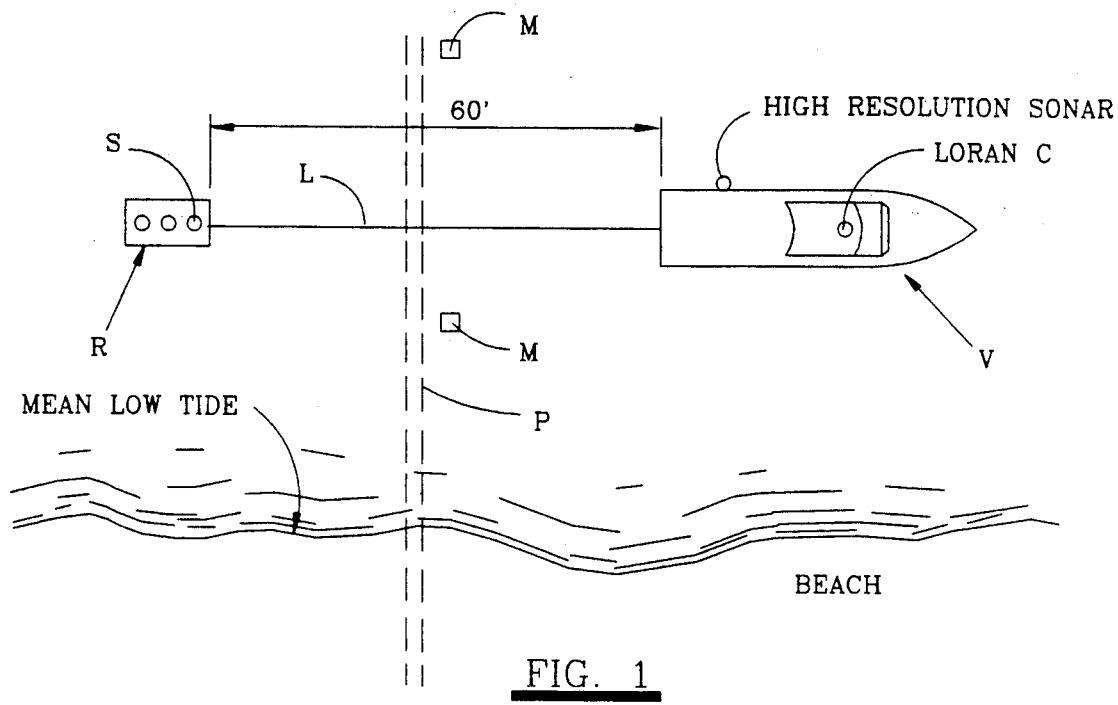
FIG. 1 is a plain view showing the location of a submerged pipeline extending seaward from a beach with the pipeline trailer of the present being towed across the pipeline.
Figure 2:
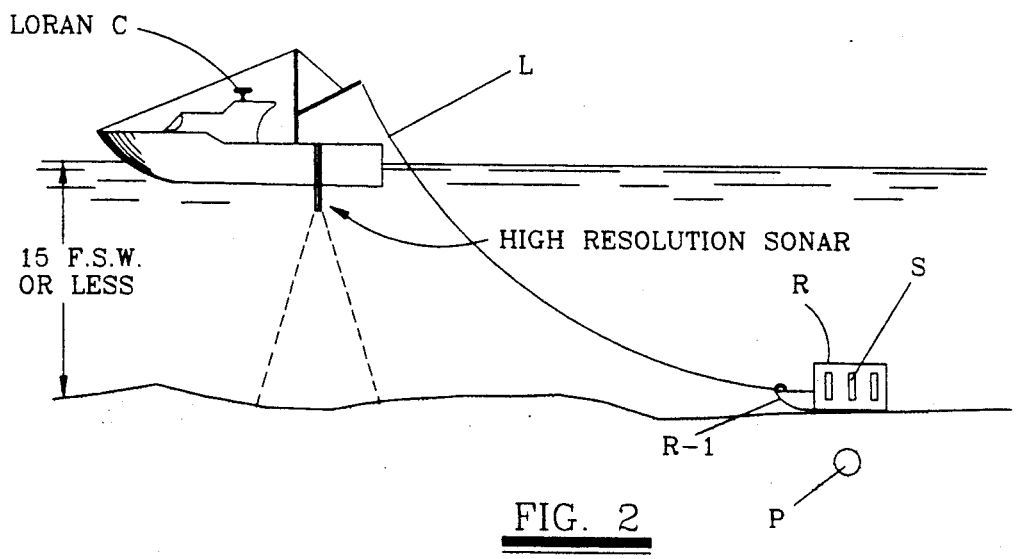
FIG. 2 is a view in elevation showing the pipeline trailer apparatus being towed over a buried submerged pipeline.

As shown in FIGS. 1 and 2 of the drawings, where a pipeline is in shallow water or near a beach, a shallow draft vessel V which is suitable for operation in water depth less than 10 to 12 feet is used for towing the sled R carrying the magnetic sensors. Such vessel could be a coastal or bay shrimper which draws approximately two feet and which is equipped with a high resolution Sonar as well as a Loran or other type of automatic electronic navigation equipment adapted to accurately provide latitude and longitude coordinates as the vessel V moves through the water. A sled R which carries the magnetic sensor arrays is preferably provided with a spaced pair of flat bottom runners R with up-turned forward tips which support the sensor array in soft soils such as may be expected in shallow water regions. Such sled is towed by the shallow draft vessel at a distance of approximately 50-60 ft. aft of the towing vessel, certainly far enough to provide a scope of approximately 5 to 1 on the tow line L and a sufficient distance to avoid noise or interference from the tow boat. Although shrimp boats are not traditional oil field service vessels they provide distinct advantages including their general availability in most coastal ports, a draft which is designed for and readily workable in waters less than 10 feet deep and the assistance of boat captains with knowledge of local waters who also are experienced in towing equipment in these areas.

Thus, it will be appreciated that with the apparatus and method of the present invention pipelines buried in shallow water may be located magnetically and their course and elevation determined and charted accurately in accordance with the following claims.

What is claimed is:

1. A method of measurement to establish the burial depth and location of a pipeline buried beneath the bottom in shallow water comprising the steps of
    (a) locating the ends of the length of pipeline to be measured;
    (b) selecting a plurality of spaced points along the pipeline intermediate of the located ends;
    (c) marking such spaced points with buoys or other markers visible at the surface of the water;
    (d) positioning a moveable vehicle having an array of magnetic pipe sensors carried thereon near the pipeline adjacent to one of its located ends;
    (e) moving said vehicle and array of magnetic pipe sensors across the pipeline adjacent to the spaced points; and
    (f) recording the burial depth of the pipeline adjacent each such spaced marker.

2. The invention of claim 1 wherein the vehicle is moved across the pipeline along a path that is oriented to cross the pipeline at a right angle to the longitudinal axis of the pipeline at the various crossing points.

3. The invention of claim 1 including marking the located ends of the pipeline with stakes, buoys or other markers visible from the water surface.

4. The invention of claim 1 wherein the vehicle is moved across the pipeline along a course that is oriented to cross the pipeline at a crossing angle within the range of twenty degrees to one hundred sixty degrees relative to the longitudinal axis of the pipeline.

5. A method of determining the location and elevation of a pipeline buried beneath shallow water comprising steps of:
    (a) selecting a plurality of data gathering points spaced along a portion of the pipeline
    (b) marking the selected spaced points along the pipeline
    (c) moving magnetic pipe sensors across the pipeline at the selected data points
    (d) determining the latitude - longitude position of each selected point
    (e) measuring the depth at which the buried pipe is buried beneath the surface of the water adjacent the pipeline data point.

6. The invention of claim 4 wherein the data regarding the latitude and longitude as well as the buried depth taken at each spaced data gathering point along the pipeline is correlated to project the elevation and azimuth of the pipeline at any point within the field of the data measuring points.

* * * * *